(12) United States Patent
Anderson

(10) Patent No.: US 9,068,641 B2
(45) Date of Patent: Jun. 30, 2015

(54) GEARBOX WITH A THREE-POINT MOUNTING THAT REDUCES GEARBOX DISTORTION

(75) Inventor: George E. Anderson, Champlin, MN (US)

(73) Assignee: Crown Iron Works Company, Roseville, MN (US)

( * ) Notice: Subject to any disclaimer, the term of this patent is extended or adjusted under 35 U.S.C. 154(b) by 0 days.

(21) Appl. No.: 13/462,491

(22) Filed: May 2, 2012

(65) Prior Publication Data

US 2012/0285281 A1 Nov. 15, 2012

Related U.S. Application Data

(60) Provisional application No. 61/481,565, filed on May 2, 2011.

(51) Int. Cl.
*F16H 57/025* (2012.01)
*F16H 57/038* (2012.01)

(52) U.S. Cl.
CPC ......... *F16H 57/025* (2013.01); *Y10T 74/19642* (2015.01); *Y10T 74/2186* (2015.01); *F16H 57/038* (2013.01)

(58) Field of Classification Search
USPC ................................ 74/416, 417, 425, 606 R
See application file for complete search history.

(56) References Cited

U.S. PATENT DOCUMENTS

| 2,672,766 | A | * | 3/1954 | Dunkelberger | ................. 74/640 |
| 4,282,767 | A | * | 8/1981 | Guichard | ......................... 74/427 |
| 5,836,219 | A | * | 11/1998 | Klingler et al. | ............ 74/606 R |
| 8,505,412 | B2 | * | 8/2013 | Murakami | .................. 74/606 R |
| 2003/0000326 | A1 | * | 1/2003 | Reeb et al. | ....................... 74/425 |
| 2005/0223832 | A1 | * | 10/2005 | Li et al. | ........................ 74/425 |
| 2008/0087123 | A1 | * | 4/2008 | Li et al. | ........................... 74/425 |
| 2010/0060061 | A1 | * | 3/2010 | Koga et al. | ................. 297/344.1 |

* cited by examiner

*Primary Examiner* — William C Joyce
(74) *Attorney, Agent, or Firm* — Nawrocki, Rooney & Sivertson, P.A.

(57) ABSTRACT

A gearbox comprises a gearbox housing containing a gear train whose shafts are supported by the housing. The housing is fastened to a mounting plate at exactly three mounting points. A number of features cooperate with this three mounting point structure to reduce distortion of the housing that may cause misalignment of individual meshing gears in the gear train, leading to premature failure of those gears transmitting high torque.

6 Claims, 1 Drawing Sheet

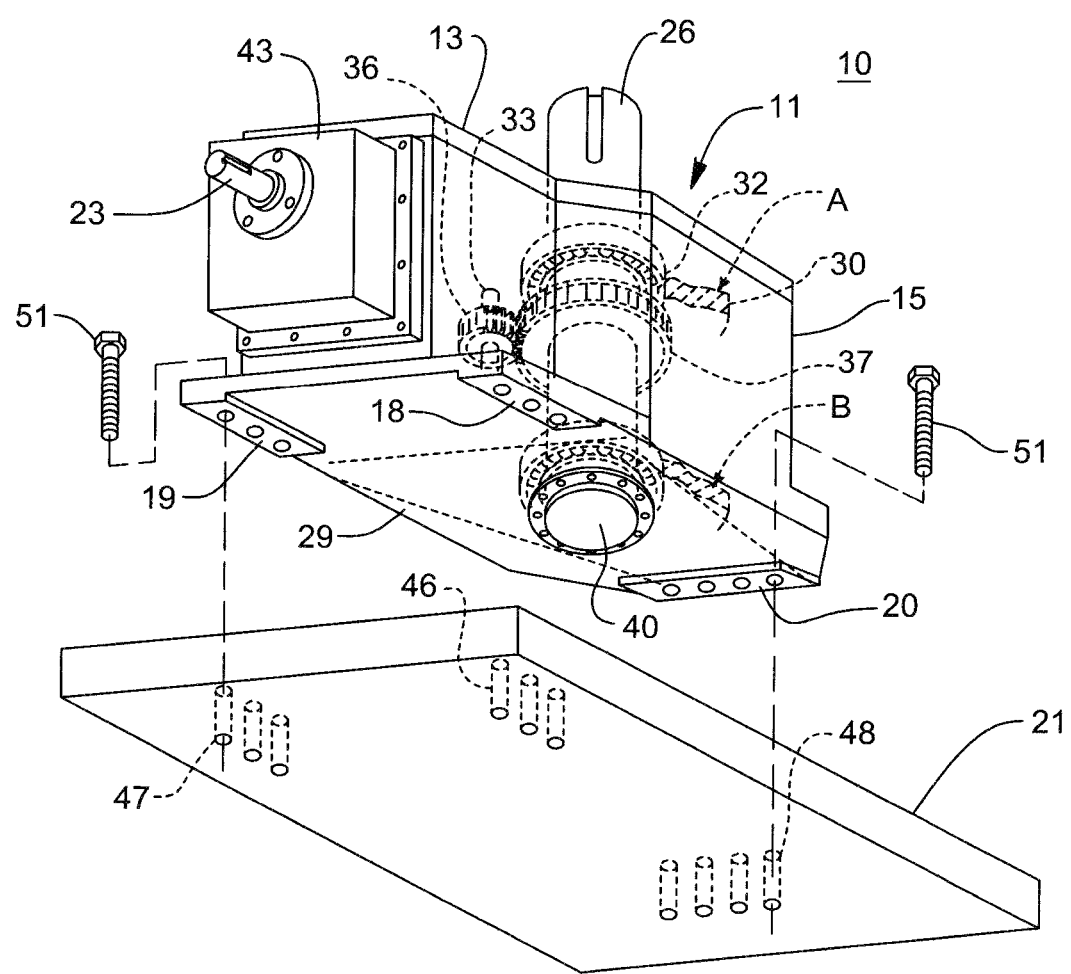

GEARBOX WITH A THREE-POINT MOUNTING THAT REDUCES GEARBOX DISTORTION

BACKGROUND

Certain industrial processes require the use of speed reduction gear trains to reduce the customary speed of electrical motors to a few tens of rpm or less. The output shaft gear of such a gear train is physically quite large, perhaps several feet in diameter. Such a gear train and the housing that typically holds it will be referred to as a gearbox. An input shaft provides high speed low torque power.

The housing provides support for the bearings on which the gears' shafts turn, and also protects the gears from damage and holds a gear lubricant such as gear grease. A typical housing comprises a case and a cover. In one preferred design the gear train includes a pair of bevel gears for allowing an output shaft whose axis is at right angles to the input shaft.

The gear train has an output gear perhaps several feet in diameter that the output shaft carries. The torque that the output gear provides in these applications is often extremely large. For example, such a gear train may be used to slowly rotate a large industrial component holding materials with combined total weight of many tons. The large output torque of such a gear train produces on the teeth of both the output gear and the pinion gear driving the output gear, contact stresses that are extremely large as well.

Most gears are manufactured with teeth having cycloidal profiles, which provide for rolling line contact between meshing gears. Rolling contact avoids sliding between meshing teeth surfaces so little frictional wear occurs. Line contact (as opposed to point contact) reduces the Hertzian stress (force per unit contact area) on these teeth and further increases their life.

High precision machining now available for the teeth on such gears provides the opportunity for reliably creating during operation, continuous line contact between the individual teeth of the output gear and the meshing pinion gear. High precision bearings for the gear shafts further enhance the opportunity for continuous precision meshing of output gear teeth.

Unfortunately, output gear teeth continue to fail, often showing damage associated with excessive Hertzian stress. Such failure is costly, in that these gearboxes are very expensive. Further, it requires the entire installation to cease operation during gearbox or gear replacement. Since these gearboxes are often specially designed for a particular installation, replacement may take a long time. Alternatively, an installation may keep a spare gearbox available, reducing downtime but adding overhead costs to the operation of the installation.

Accordingly, the current state of affairs for installations using these large, high-torque gearboxes is unsatisfactory.

BRIEF DESCRIPTION OF THE INVENTION

Investigation suggests that the current practice of bolting high output torque gearboxes to a rigid mounting plate at four different points may distort the gearbox case. Because of the extremely high output torques involved, very strong attachment bolts are used to fasten the case to mounting points on the mounting plate.

The geometry of the mounting points on the mounting plate is typically difficult to control. When these mounting plate mounting points do not accurately align with the mounting points on the gearbox and no corrective shimming occurs, bolting the gearbox case to the mounting plate at four points can potentially distort the entire case. This distortion of the case is small because the case is quite stiff compared to the mounting plate, but still causes slight misalignment of the meshing gears within the case.

Such gearbox case distortion has to potential to alter the interface between the high-torque output shaft gear and the gear driving the output shaft gear. This altered interface may lead to point or even intermittent contact rather than line contact between the gear faces, causing premature damage to the gear faces, and eventual failure of the gears.

This invention limits gearbox distortion arising from the common practice of using four points for mounting the gearbox on the mounting plate. The gearbox is fastened to a mounting plate in a special way.

A gearbox has a gearbox case containing a gear train comprising gears and shafts supporting the gears. Said gearbox case is to be fastened to a mounting plate. The gear train has at least input and output shafts, each passing through a wall of the case, and mounted for rotation within and supported by the gearbox case.

The input shafts is to receive torque from an external source. A first input shaft bearing carries the input shaft to allow its rotation, and to thereby provide torque to the gear case.

The output shafts supplies torque substantially greater than the torque applied to the input shafts. First and second output shaft bearings support the output shaft to allow its rotation.

A flat surface forming a part of the exterior of the case includes exactly first, second, and third spaced apart mounting surfaces, each mounting surfaces having at least one bolt engaging the mounting surface for attaching the case to the mounting plate only at the mounting surface. Said output shaft first bearing is attached to the case at a point between the first, second, and third mounting surfaces.

A preferred gearbox has two flanges, each carrying one of the first and second mounting surfaces. These mounting surfaces are located closer to the input shaft than to the output shaft.

BRIEF DESCRIPTION OF THE DRAWING

The FIGURE shows the invention with three mounting points for the gearbox housing.

DESCRIPTION OF THE PREFERRED EMBODIMENTS

The FIGURE shows a gearbox 10 having a housing comprising a case 15 and cover 13. Case 15 is to be attached to a mounting plate 21 using bolts 51 that fit through holes in mounting points 18, 19, and 20 into holes 46, 47, and 48 of mounting plate 21. Mounting points 18, 19, and 20 preferably are all carried on a single flat surface of case 15, and preferably on flanges forming a part of the bottom surface of case 15 as shown. Preferably, mounting surface 18, 19, and 20 project slightly past the surface carrying them to avoid any interference or contact between case 15 and mounting plate 21, other than at the individual mounting points 18, 19, and 20.

Gearbox 10 in one version contains a gear train having an input shaft 23 and an output shaft 26. The gear train multiplies at output shaft 26, the torque applied to input shaft 23 by an overall ratio of 100 or more.

Mounting points 18, 19, and 20 are positioned at the corners of an isosceles triangle having a base line and opposite thereto, the vertex. Mounting point 20 is at the apex of this triangle. Mounting points 18 and 19 are at the ends of the base line. Input shaft 23 is adjacent to and symmetrically located with respect to the second and third mounting points 18 and 19. Arranging other elements of gearbox 10 symmetrically with respect to this isosceles triangle may reduce gearbox 10 distortion under the extreme torque loads that shaft 16 carries.

An output gear 37 is fixed to output shaft 16 and meshes with and is driven by an intermediate gear 36. Gears 36 and 37 are shown in phantom outline within gearbox 10; the intermediate gears comprising the gear train other than gear 36 are not shown. Intermediate gear 36 typically has a fraction of the number of teeth that output gear 37 has. Torque is transmitted to output gear 37 from input shaft 23 through the one or more intermediate gears in addition to gear 36. The gear train may include bevel gears that orient the axis of the output shaft 26 to be orthogonal to the axis of input shaft 23, which is the configuration of gearbox 10.

Bearing 43 mounts input shaft 23 and is supported by at least one wall of case 15. A shaft 33 attached between case 15 and cover 13 carries intermediate gear 36.

Gear 36 through the gear train, applies relatively high torque to shaft 26 through output gear 37, hence forces between the meshing tooth faces of both gears 36 and 37 are relatively high. Accordingly, any misalignment between the meshing teeth of gears 36 and 37 has the potential to create points of very high pressure on these teeth.

An internal bracket 30 (typically integral with or forming a part of cover 13) carries the upper end of shaft 33, and also carries an upper bearing 32 for output shaft 26. A portion of internal bracket 30 is shown in phantom in the FIGURE. The floor of case 15 carries an inner triangular or trapezoidal mounting plate or bracket 29 that in turn carries a second output shaft bearing 40 also having low axial and radial runout.

As the FIGURE shows, thrust plate 29 is in the shape of a symmetric trapezoid having lone and short parallel sides and non-parallel sides of equal length. The short parallel side of plate 29 is adjacent to and attached to mounting point 20. The long parallel side of plate 29 extends between mounting points 18 and 19, and is attached to them. Bearing 40 lies on a line that may be drawn to bisect the long and short parallel ends, i.e., is centrally mounted on plate 29. Thus, plate 29 is symmetrically arranged with the mount points 18, 19, and 20.

Both mounting bracket 29 and bearing 40 are spaced from the floor or bottom of case 15 to avoid damage from contaminants that settle to the floor of case 15. Bracket 29 is solidly mounted to the floor of case 15, or is integral therewith, and has sufficient stiffness to distribute high thrust and torque loads across a substantial portion of the case 15. Brackets 29 and 30 are strongly attached to case 15 and cover 13 respectively. Cover 13 is strongly attached to case 15. Because of this, any distortion of case 15 can also distort cover 13 and brackets 29 and 30.

In one version, brackets 29 and 30 are designed to compensate for shaft 26 deflection between bearings 32 and 40 by having different in-plane stiffnesses. Thus, if gear 37 is positioned closer to bearing 32 than to bearing 40, then bracket 30 is proportionately stiffer than bracket 29 so that the axis of shaft 26 when under maximum load is almost exactly parallel with the shaft 26 axis when shaft 26 is unloaded.

To avoid premature failure of gear 37 and pinion gear 36, shafts 33 and 26 should maintain their geometry respecting each other regardless of the torque that shaft 26 carries. The design of shaft 26 and bearings 32 and 40 allows them to contribute only a very small amount of gear 37 deflection arising from high torque transmission. This requires that shafts 33 and 26 and housing 11 have substantial stiffness.

Case 15 has a mounting feature that substantially reduces distortion of housing 11 caused during attachment of housing 11 to a large, stiff base such as mounting plate 21. In the embodiment of the FIGURE, case 15 has two spaced apart mounting points 18 and 19 near the input shaft bearing 43 and relatively distant from the axis of output shaft 26. Mounting points 18 and 19 may be integral with case 15 as shown, with holes through which mounting bolts 51 pass. A third mounting point 20, also integral with case 15, is spaced from mounting points 18 and 19 and may be closer to the axis of output shaft 26. Bolts 51 fasten case 15 at these three mounting points 18-20 by screwing into threaded mounting holes 46, 47, and 48 on mounting plate 21. Clamps that lock onto flanges or projections of case 15 are also possible fastener elements.

Using only the three mounting points 18, 19, and 20 appears to substantially reduce the distortion of housing 11 typically induced by imperfectly shimmed four-point mounting. Three point mounting, even if the individual mounting points are misaligned, distort the gear case 11 only slightly at worst. On the other hand, a fourth mounting point must be accurately shimmed with the other three mounting surfaces to avoid such distortion. For such shimming to be effective, the installer must precisely measure the gear case 11 and the mounting plate's mating geometries. Since these gearboxes 10 are typically very heavy, mounting them properly to avoid distortion is difficult and time-consuming.

The situation is similar to the performance of a three-legged stool on an uneven surface as opposed to a four-legged stool. A three-legged stool will always sit solidly on an uneven surface. Everyone is familiar with situations where a four-legged stool or table in a restaurant rocks on an uneven floor, until matchbooks or folded napkins (i.e. shims) are placed under one leg.

Three-point mounting of case 15 likely solves much of the case 15 distortion problem. A further possible source for case 11 distortion may arise from the high reactive torque that shaft 26 applies to case 11. That is, shaft 26 creates a couple tending to twist case 15.

The following may address this issue, if present. While the FIGURE shows two mounting points 18 and 19 relatively distant from output shaft 23, alternatively two of the mounting points 18-20 may be placed closer to output shaft 26 and one closer to input shaft 23. This configuration may make the overall installation more robust than that shown in the FIGURE. Placing the resistance to reactive torque applied by shaft 26 to case 15 by a single one of the mounting points 18-20 as far from shaft 26 as the dimensions of case 15 allow, may also further reduce distortion of case 15 arising from the high shaft 26 torque itself.

The invention claimed is:

1. A gearbox having a gearbox case containing a gear train comprising gears and shafts supporting the gears, said gearbox case to be fastened to a mounting plate, said gear train having at least input and output shafts, each passing through a wall of the case, and mounted for rotation within and supported by the gearbox case, said input shaft for receiving torque from an external source, said input shaft carried for rotation by an input shaft bearing carried on a wall of the gearbox case, and providing torque to the gear train; said output shaft deriving torque from the input shaft, for supplying torque substantially greater than the torque applied to the input shaft, and carried for rotation by first and second output shaft bearings, wherein the exterior of the case includes a flat surface carrying exactly first, second, and third spaced apart mounting surfaces, each mounting surface having at least one bolt engaging the mounting surface for attaching the case to the mounting plate only at the respective mounting surface, and wherein said first output shaft bearing is mounted on the case at a point between the first, second, and third mounting surfaces;

wherein the mounting surfaces are all carried on a single flat surface of the case; and wherein each mounting surface has a plurality of mounting holes, each to receive a bolt to fasten the mounting surface to the mounting plate.

2. The gearbox of claim 1, wherein the axis of the output shaft passes through a point closer to the first mounting surface than to the second and third mounting surfaces.

3. The gearbox of claim 2, wherein the second and third mounting surfaces are carried on flanges located closer to the input shaft than to the output shaft.

4. The gearbox of claim 1, wherein the second and third mounting surfaces are located nearer to the input shaft bearing than is the first mounting surface.

5. The gearbox of claim 1, wherein a plurality of flanges form a part of the single surface of the case and carry the mounting surfaces.

6. The gearbox of claim 5 wherein the mounting surfaces project from the surface of the case carrying the mounting surfaces, to thereby prevent contact between the case and the mounting plate other than at the individual mounting surfaces.

* * * * *